United States Patent
Lavoie et al.

(10) Patent No.: US 10,160,447 B2
(45) Date of Patent: Dec. 25, 2018

(54) SYSTEMS AND METHODS FOR ABRUPT ROAD CHANGE ASSIST AND ACTIVE SUSPENSION CONTROL

(71) Applicant: FORD GLOBAL TECHNOLOGIES, LLC, Dearborn, MI (US)

(72) Inventors: Erick Michael Lavoie, Dearborn, MI (US); Miguel A. Bahena, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/887,934

(22) Filed: Oct. 20, 2015

(65) Prior Publication Data

US 2017/0106855 A1 Apr. 20, 2017

(51) Int. Cl.
*B60W 30/00* (2006.01)
*B60W 50/00* (2006.01)
(Continued)

(52) U.S. Cl.
CPC .......... *B60W 30/00* (2013.01); *B60W 10/184* (2013.01); *B60W 10/22* (2013.01); *B60W 50/00* (2013.01); *B60W 2050/0002* (2013.01); *B60W 2400/00* (2013.01); *B60W 2510/18* (2013.01); *B60W 2510/22* (2013.01);
(Continued)

(58) Field of Classification Search
CPC ...... B60W 30/00; B60W 10/22; B60W 50/00; B60W 10/184; B60W 2400/00; B60W 2510/18; B60W 2050/0002; B60W 2510/22; B60W 2550/10; B60W 2550/143; B60W 2550/147; B60W 2600/00; B60W 2720/10
See application file for complete search history.

(56) References Cited

U.S. PATENT DOCUMENTS 4,657,280 A 4/1987 Ohmori
4,674,767 A 6/1987 Kuroki et al.
(Continued)

FOREIGN PATENT DOCUMENTS

DE 4119494 A1 1/1992
DE 4117091 A1 11/1992
(Continued)

OTHER PUBLICATIONS

Ramsundar K. Ganesan, et al., "An Image Processing Approach to Detect Obstacles on Road", SAE International, published Jan. 14, 2015, 7 pgs.
(Continued)

*Primary Examiner* — Frederick M Brushaber
(74) *Attorney, Agent, or Firm* — Jones Robb, PLLC; Frank MacKenzie (57) ABSTRACT

Systems and methods for limiting a current operating speed of a vehicle are disclosed. A position of the vehicle relative to an abrupt road change in front of the vehicle and a current operating speed are determined. Information regarding a profile of the abrupt road change is detected. Based on the determined position and current operating speed, a brake torque output is adjusted to reduce the current operating speed. Based on the profile, suspension parameters associated with the vehicle are dynamically adjusted.

16 Claims, 4 Drawing Sheets

(51) Int. Cl.
*B60W 10/184* (2012.01)
*B60W 10/22* (2006.01)

(52) U.S. Cl.
CPC ..... *B60W 2520/10* (2013.01); *B60W 2550/10* (2013.01); *B60W 2550/143* (2013.01); *B60W 2550/147* (2013.01); *B60W 2600/00* (2013.01); *B60W 2720/10* (2013.01)

(56) References Cited

U.S. PATENT DOCUMENTS

| | | | |
|---|---|---|---|
| 4,696,489 A | 9/1987 | Fujishiro et al. | |
| 4,714,271 A | 12/1987 | Buma et al. | |
| 4,717,173 A | 1/1988 | Sugasawa et al. | |
| 4,728,120 A | 3/1988 | Buma et al. | |
| 4,733,883 A * | 3/1988 | Sugasawa | B60G 17/0164 280/5.513 |
| 4,744,589 A | 5/1988 | Buma et al. | |
| 4,749,210 A | 6/1988 | Sugasawa et al. | |
| 4,770,438 A | 9/1988 | Sugasawa et al. | |
| 4,861,067 A | 8/1989 | Booher | |
| 4,899,296 A | 2/1990 | Khattak | |
| 4,936,604 A * | 6/1990 | Kawagoe | B60G 17/018 280/5.503 |
| 5,016,908 A | 5/1991 | Athanas et al. | |
| 5,058,017 A * | 10/1991 | Adachi | B60G 17/016 280/5.507 |
| 5,067,687 A | 11/1991 | Patel et al. | |
| 5,123,671 A | 6/1992 | Driessen et al. | |
| 5,163,319 A | 11/1992 | Spies et al. | |
| 5,193,844 A | 3/1993 | Butsuen et al. | |
| 5,203,584 A | 4/1993 | Butsuen et al. | |
| 5,269,557 A | 12/1993 | Butsuen et al. | |
| 5,347,457 A | 9/1994 | Tanaka et al. | |
| 5,450,322 A | 9/1995 | Tanaka et al. | |
| 5,671,142 A | 9/1997 | Tatarazako et al. | |
| 6,019,495 A * | 2/2000 | Yamada | B60G 17/0152 280/5.515 |
| 6,122,578 A | 9/2000 | Knolle et al. | |
| 6,233,510 B1 | 5/2001 | Platner et al. | |
| 6,385,529 B1 * | 5/2002 | Minowa | B60K 31/0008 701/300 |
| 6,456,194 B1 | 9/2002 | Carlson et al. | |
| 7,587,267 B2 | 9/2009 | Mori et al. | |
| 7,909,417 B2 | 3/2011 | Wang et al. | |
| 8,311,734 B2 | 11/2012 | Georgis et al. | |
| 8,451,140 B2 | 5/2013 | Piccinini et al. | |
| 8,630,795 B2 | 1/2014 | Breed et al. | |
| 8,892,304 B2 | 11/2014 | Lu et al. | |
| 9,008,858 B1 * | 4/2015 | Payne | B60H 1/00771 701/1 |
| 9,626,763 B1 | 4/2017 | Hoye et al. | |
| 2004/0012162 A1 * | 1/2004 | Burke | B60K 6/32 280/5.5 |
| 2004/0064240 A1 * | 4/2004 | Sugano | B60K 31/0008 701/93 |
| 2005/0209742 A1 * | 9/2005 | Sakakibara | B60W 50/00 701/1 |
| 2005/0218718 A1 * | 10/2005 | Iwatsuki | B60T 8/1766 303/177 |
| 2006/0064223 A1 | 3/2006 | Voss | |
| 2006/0074533 A1 | 4/2006 | Karaba et al. | |
| 2006/0215020 A1 | 9/2006 | Mori et al. | |
| 2006/0243548 A1 | 11/2006 | Stein et al. | |
| 2007/0088464 A1 * | 4/2007 | Coates | G08G 1/096716 701/1 |
| 2007/0217433 A1 | 9/2007 | Doppler et al. | |
| 2008/0015743 A1 | 1/2008 | Haug | |
| 2008/0079280 A1 | 4/2008 | Nakamura et al. | |
| 2008/0133066 A1 | 6/2008 | Takenaka | |
| 2008/0275606 A1 | 11/2008 | Tarasinski et al. | |
| 2009/0043452 A1 | 2/2009 | Sekiya et al. | |
| 2009/0088918 A1 | 4/2009 | Takenaka et al. | |
| 2009/0097038 A1 | 4/2009 | Higgins-Luthman et al. | |
| 2009/0105921 A1 * | 4/2009 | Hanatsuka | B60G 17/0165 701/80 |
| 2009/0287368 A1 * | 11/2009 | Bonne | B60T 7/12 701/31.4 |
| 2009/0299857 A1 | 12/2009 | Brubaker et al. | |
| 2010/0042292 A1 | 2/2010 | Schindler et al. | |
| 2010/0082216 A1 | 4/2010 | Yasui et al. | |
| 2010/0138108 A1 | 6/2010 | Kajino et al. | |
| 2011/0084503 A1 * | 4/2011 | Li | B60G 17/019 290/1 R |
| 2011/0137508 A1 * | 6/2011 | Garcia Manchado | B60R 16/0236 701/31.4 |
| 2012/0316746 A1 | 12/2012 | Park | |
| 2013/0103259 A1 | 4/2013 | Eng et al. | |
| 2013/0345933 A1 | 12/2013 | Norton et al. | |
| 2014/0163837 A1 | 6/2014 | Um et al. | |
| 2014/0195112 A1 | 7/2014 | Lu et al. | |
| 2015/0046084 A1 | 2/2015 | Choi et al. | |
| 2015/0088378 A1 * | 3/2015 | Sugai | B60G 17/018 701/37 |
| 2015/0166072 A1 * | 6/2015 | Powers | B60W 40/06 701/1 |
| 2015/0246672 A1 * | 9/2015 | Pilutti | B60W 30/00 701/2 |
| 2015/0274028 A1 * | 10/2015 | Payne | B60L 11/1861 701/22 |
| 2015/0274030 A1 * | 10/2015 | Payne | B60L 11/1874 701/22 |
| 2016/0144861 A1 * | 5/2016 | Cao | B60W 30/181 701/22 |

FOREIGN PATENT DOCUMENTS

| | | | |
|---|---|---|---|
| DE | 102006039353 | A1 | 3/2008 |
| DE | 102009009063 | A1 | 10/2009 |
| DE | 102008032545 | A1 | 1/2010 |
| DE | 102009021107 | A1 | 11/2010 |
| DE | 102010029947 | A1 | 12/2011 |
| DE | 102010044263 | A1 | 3/2012 |
| KR | 20130000125 | A | 1/2013 |
| WO | 89/04498 | A1 | 5/1989 |

OTHER PUBLICATIONS

Hua-Tsung Chen, et al.; "Vision-Based Road Bump Detection Using a Front-Mounted Car Camcorder", 2014 22nd International Conference on Pattern Recognition, IEEE Computer Society, pp. 4537-4542.
Examination Report issued in corresponding German Patent Application No. 10 2013 206 109.9, dated Jan. 7, 2014.
Non-Final Office Action dated Oct. 9, 2015 from U.S. Appl. No. 14/246,793.
Final Office Action dated Apr. 29, 2016 from U.S. Appl. No. 14/246,793.
Non-Final Action dated Nov. 18, 2016 from U.S. Appl. No. 14/246,793.
Final Office Action dated May 16, 2017 from U.S. Appl. No. 14/246,943.
Notification of First Office Action in CN Application No. 201510160718.1 dated May 21, 2018.
Examination Report in DE Application No. 10 2014 206 481.3 dated Dec. 3, 2014.
Non-Final Office Action in U.S. Appl. No. 14/678,756, dated Apr. 26, 2017.
Non-Final Office Action in U.S. Appl. No. 14/678,756, dated May 9, 2016.
Final Office Action in U.S. Appl. No. 14/678,756, dated Nov. 28, 2016.

* cited by examiner

SYSTEMS AND METHODS FOR ABRUPT ROAD CHANGE ASSIST AND ACTIVE SUSPENSION CONTROL

TECHNICAL FIELD

The present disclosure relates generally to suspension control and management of vehicle speed when an abrupt road change is detected. More specifically, the present disclosure relates to proactive control of a vehicle suspension system and a current operating speed of the vehicle in response to a determined and/or encountered abrupt road change.

BACKGROUND

A vehicle's suspension system and relative operating speed play vital roles in both serving to isolate the occupants of the vehicle from irregularities of the road surface and to control the stability of the vehicle when, for example, an abrupt road change is encountered during the vehicle's operation. In some instances, for example, when a vehicle driver approaches an irregularity of the road surface too fast, the vehicle may be damaged, disabled, or the ride may become uncomfortable for vehicle occupants due to the relative position and operating speed of the vehicle when the irregularity is encountered.

In order to improve the ride and comfort of the vehicle occupants and to achieve stable road handling when, for example, an abrupt road change is encountered, it is desirable to dynamically control various aspects of the vehicle's suspension and operating speed parameters. In particular, it is desirable to monitor and dynamically adjust various suspension and/or braking parameters of the vehicle's active control systems in response to a detected or encountered irregular road surface and/or abrupt road change to mitigate or avoid a sudden or unexpected impact, which may result in damage to the vehicle and/or an uncomfortable ride for occupants of the vehicle.

SUMMARY

In accordance with various exemplary embodiments, the present disclosure systems and methods for limiting a current operating speed of a vehicle are described. In accordance with one aspect of the present disclosure, a method for limiting a current operating speed of a vehicle includes determining a position of the vehicle relative to an abrupt road change in front of the vehicle and a current operating speed. Information regarding a profile of the abrupt road change is detected. Based on the determined position and current operating speed of the vehicle, a brake torque output is dynamically adjusted to reduce the current operating speed. Suspension parameters associated with the vehicle are dynamically adjusted based on the profile.

In accordance with another aspect of the present disclosure, a vehicle includes a vehicle abrupt road change and suspension assist system. The system comprises a detection unit configured to detect information about a profile of an irregular road surface in front of a vehicle and a position sensor configured to determine a distance of the vehicle relative to the irregular road surface. Based on the detected information and the distance of the vehicle from the irregular road surface, a control unit is configured to adjust an operating speed of the vehicle.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a vehicle driver may approach an irregularity in the road surface (e.g., slippery surfaces like slick, wet roads, ice or gravel) and/or an abrupt road change (e.g., a speed bump, pothole, or any other vertical derivation) too fast. In some instances, when, for example, the vehicle driver does not anticipate an impact with the irregular road surface and/or abrupt road change, the impact may result in damage to the vehicle and/or an uncomfortable ride for vehicle occupants due to the relative position and operating speed of the vehicle when the irregularity and/or abrupt road change is encountered. By automatically monitoring and dynamically adjusting various suspension, braking, and/or speed parameters of the vehicle relative to the encountered irregular road surface or abrupt road change, the transition over the irregular road surface or abrupt road change can be modulated such that the vehicle ride is comfortable for the occupants and the vehicle is not damaged. The suspension parameters include a suspension height information and vertical acceleration of a body of the vehicle relative to the abrupt road change.

For example, in one exemplary embodiment, the vehicle's control system can includes a vibration damping system that controls damping forces on at least one spring element and/or damping element in response to various road and driving conditions over a given time interval. The vibration damping system can be an active or semi-active system that dynamically detects and/or records information about a profile of the irregular road surface or abrupt road change in front of the vehicle in a direction of travel. For example, the vibration damping system can collect inputs via the vehicle's control system regarding vertical acceleration, wheel-to-body position, speed of wheel movement, vehicle speed, and lift/dive and use those inputs to determine a profile of the irregular road surface and/or abrupt road change as the vehicle transitions over the irregular road surface and/or abrupt road change. The vehicle's control system evaluates the inputs and, based on the evaluation, dynamically controls, for example, a solenoid in the damping element via the vibration damping system to provide suspension damping control. In addition, based on the determined profile and a determined vehicle operating speed, the vehicle's control system via the brake control system is configured to limit brake torque to reduce the vehicle's operating speed such that an abrupt impact as the vehicle transitions over the irregular road surface and/or abrupt road change is mitigated.

By detecting and/or recording data or information about the oncoming irregular road surface and/or abrupt road change, proactive control of the vibration damping system and vehicle's operating speed, for example, by varying brake torque, is possible. In another exemplary embodiment, a position of the vehicle relative to a known profile of the irregular road surface and/or abrupt road change may be determined using, for example, proximity sensors, topographical maps, or various other databases. The position of the vehicle is used to correspondingly adjust the vehicle's operating speed before the vehicle wheel actually encounters the irregular road surface and/or abrupt road change. This proactive control can account for any lag or transition time needed by, for example, the vehicle's vibration damping system, powertrain module, and/or anti-lock brake (ABS) modules, to adjust settings such that the vehicle's control system can switch the vehicle's operating speed and/or modulate damping settings to obtain a desired vehicle operating speed and vibration damping as the vehicle transitions over the detected irregular road surface and/or abrupt road change.

In one or more exemplary embodiments, the profile of the irregular road surface and/or abrupt road change can be recorded or scanned at a certain distance in front of the vehicle (e.g., oncoming in a direction of travel of the vehicle). For example, information and/or data about the profile of the irregular road surface and/or abrupt road change can be recorded or scanned optically or acoustically, e.g., using an optical sensor or camera, ultrasonic sensing, radar, and/or pattern sensing. The recorded or scanned information and/or data about the irregular road surface and/or abrupt road change can be determined based on, for example, a monitored profile of the road surface such as a vertical profile (e.g., a profile in the x-z plane, wherein the z axis indicates the vertical axis and the x axis indicates the horizontal axis pointing in the direction of travel), their height, z, (or change in height), respective distance, x, from the vehicle, and/or feedback from, for example, the control system.

In one or more additional embodiments, the vehicle includes a plurality of wheels. It can also comprise a front axle and a rear axle. The information and/or data about the oncoming irregular road surface and/or abrupt road change can be evaluated with respect to the front axle and/or the rear axle of the vehicle. Alternatively or additionally, the information and/or data about the irregular road surface and/or abrupt road change can be evaluated with respect to each individual wheel of the vehicle. For example, the suspension and/or damping of each wheel of the vehicle can be individually controlled depending on the obtained profile of the oncoming irregular road surface and/or abrupt road change in front of each respective wheel.

In one or more embodiments, proactive and dynamic control of various suspension, braking, and/or speed parameters of the vehicle's active control system in response to a detected or encountered irregular road surface and/or abrupt road change is enabled by adjusting a current operating speed of the vehicle and/or damping forces in anticipation of an abrupt impact. In this manner, the ride and comfort and driving dynamics of the vehicle can be simultaneously improved.

Figure 1:
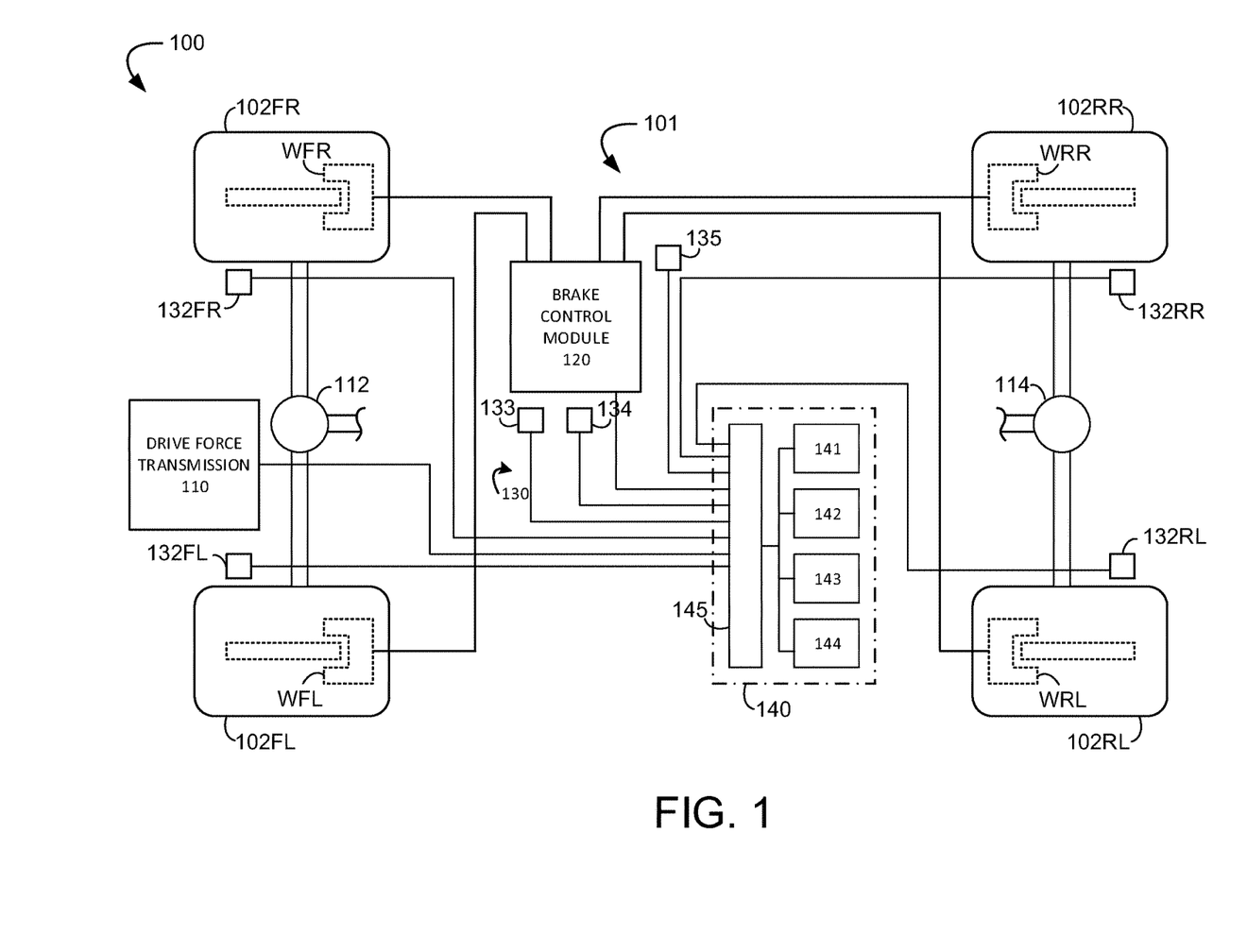
FIG. 1 is a schematic structural diagram of an exemplary vehicle, according to one or more embodiments of the disclosed subject matter.

FIG. 1 shows a schematic structural diagram of an exemplary vehicle 100 on which control system 101 is mounted. The control system 101 has a drive force transmission 110, which generates a drive force and transmits it to wheels 102 FR, 102 FL, 102 RR, and 102 RL; a brake control module 120 for generating braking force in each wheel 102 FR, 102 FL, 102 RR, and 102 RL by brake hydraulic pressure; a sensor section 130; and an electronic control unit (ECU) 140.

In an exemplary embodiment, the drive force transmission 110 can include, for example, an engine that generates a drive force; a throttle actuator that includes a motor configured to control a throttle valve opening of an intake pipe of the vehicle engine; and, a fuel injector for transferring fuel to intake ports of the vehicle engine. The drive force transmission 110 further includes a transmission whose input shaft is connected to an output shaft of the engine; and, differentials 112, 114 that distribute and transmit the drive force from the engine to the front wheels 102 FR, 102 FL and rear wheels 102 RR, 102 RL.

The brake control module 120 includes a brake hydraulic pressure generating portion that generates hydraulic pressure, which corresponds to an operating force of a brake pedal at the front wheels 102 FR, 102 FL and rear wheels 102 RR, 102 RL of the vehicle 100. Brake hydraulic adjusting sections can also be provided at each of the front wheels 102 FR, 102 FL and rear wheels 102 RR, 102 RL, each of which can adjust the brake hydraulic pressure supplied to corresponding wheel cylinders WFR, WFL, WRR, WRL through either a pressure-reducing and/or pressure inducing valve. The hydraulic brake pressure within the wheel cylinders WFR, WFL, WRR, and WRL can be increased, maintained, and/or reduced through control of either valve. Return brake fluid can be returned from the pressure-reducing valves to a reservoir via hydraulic pumps.

The sensor section 130 can include wheel position sensors 132 FR, 132 FL, 132 RR, and 132 RL which respectively output signals having frequencies corresponding to the respective rotational speeds of the wheels 102 FR, 102 FL, 102 RR, and 102 RL, wheel-to-body movement, and suspension height information; an accelerometer (not shown) mounted on each corner of the vehicle 100 that outputs signals corresponding to a vertical acceleration of the body of the vehicle; a vehicle speed sensor 134 mounted in, for example, a transaxle, which outputs a voltage signal to a powertrain control module (PCM) in relation to a current vehicle operating speed; a lift/drive input sensor 135 which obtains suspension lift information via the PCM from a throttle position, vehicle speed, and transaxle gear input signal. The PCM calculates suspension dive information from a rate of vehicle speed change when decelerating. In addition, the sensor section 130 can include a plurality of proximity sensors 133 which detect and/or record data or information an oncoming irregular road surface and/or abrupt road change; and a brake switch (not shown) that detects whether a brake pedal is operated or not and output ON/OFF signals in accordance with the operation or non-operation of the brake pedal.

The control system 101 includes an Electronic Control Unit (ECU) 140. The ECU 140 is a microcomputer which includes a Central Processing Unit (CPU) 141; Read-Only Memory (ROM) 142 in which are previously stored routines (programs) to be executed by the CPU 141, tables (look-up tables and stored maps), constants, and the like; Random-Access Memory (RAM) 143 in which the CPU 141 temporarily stores data as necessary; backup RAM 144 which stores data when the power supply is on and which maintains the stored data when the power supply is cut off; and an interface 145. The above components can be interconnected via a bus. The interface 145 can be configured to supply signals from the sensors 132, 133, 134, 135, accelerometers, PCM, brake switch, etc. to the CPU 141. Further, in accordance with instructions from the CPU 141, the interface 145 outputs signals to, for example, solenoid valves (not shown) of the suspension damping system, the drive force transmission 110, the brake control module 120, and/or the vehicle operator.

Figure 2A:
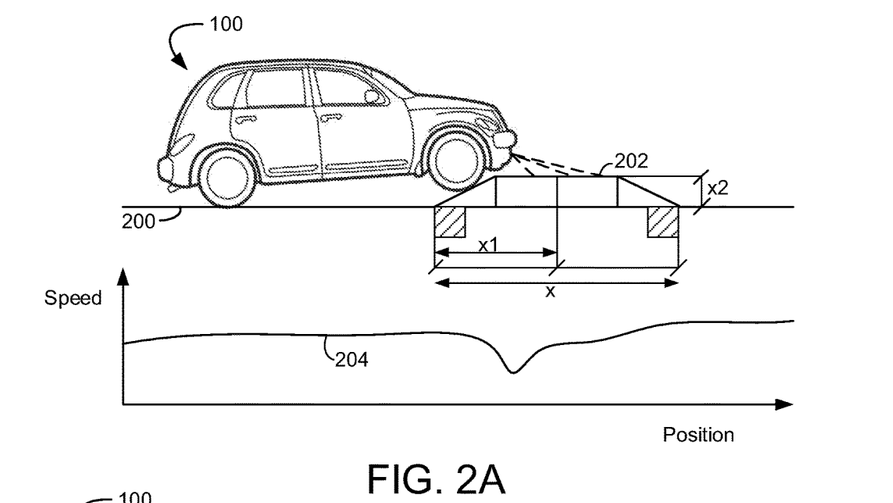
FIG. 2A is an illustration of a wheel of a vehicle abruptly encountering an abrupt road change, according to one or more embodiments of the disclosed subject matter.

FIG. 2A is a schematic illustration of a wheel 102 FR, 102 FL, 102 RR, 102 RL of a vehicle 100 abruptly encountering an abrupt road change 202 (e.g., a speed bump, a pothole, or any other vertical derivation). In FIG. 2A, the horizontal direction is indicated along an x-axis and the vertical direction and speed is indicated on the z-axis. The abrupt road change 202 results in a deviation from the immediately preceding road surface 200 and thus a positive change in the surface height $x_2$. One of ordinary skill in the art would understand that the deviation can be a negative deviation (e.g., a pothole) and/or increased wheel spin and subsequent loss of traction and vehicle stability when, for example, accelerating on an irregular road surface (e.g., slippery surfaces like slick, wet roads, ice or gravel).

In one exemplary embodiment, a wheel 102 FR, 102 FL, 102 RR, 102 RL of a vehicle 100 abruptly encounters the abrupt road change 202, which includes a positive slope portion where the front wheels 102 FR, 102 FL first encounter the abrupt road change 202, a negative slope portion where the wheels 102 FR, 102 FL, 102 RR, 102 RL leave the abrupt road change 202, and a top portion between the slope portion. For example, as the vehicle 100 travels on the road surface 200 in the x direction at an operating speed $v_x$, the front wheels 102 FR, 102 FL abruptly encounter the abrupt road change 202. As the wheels 102 FR, 102 FL encounter the abrupt road change 202, the wheels 102 FR, 102 FL (or the vehicle 100) experiences an additional vertical speed component, $v_z$. The vertical speed component $v_z$ can be dependent on the vibration damping system (not shown) employed by the vehicle 100. Because the abrupt road change 202 is not detected before the vehicle 100 encounters it, the operating speed $v_x$ is not comfortably reduced in advance of hitting the abrupt road change 202 and the impact to the vehicle 100 is not mitigated. The impact to the vehicle 100 is illustrated line 204 as a relationship between the operating speed $v_x$ of the vehicle 100 and the position of the vehicle 100 in relation to the abrupt road change 202 when impact occurs. In addition to jarring the occupants of the vehicle, such an unmitigated impact may result in damage to or disablement of the vehicle 100.

Figure 2B:
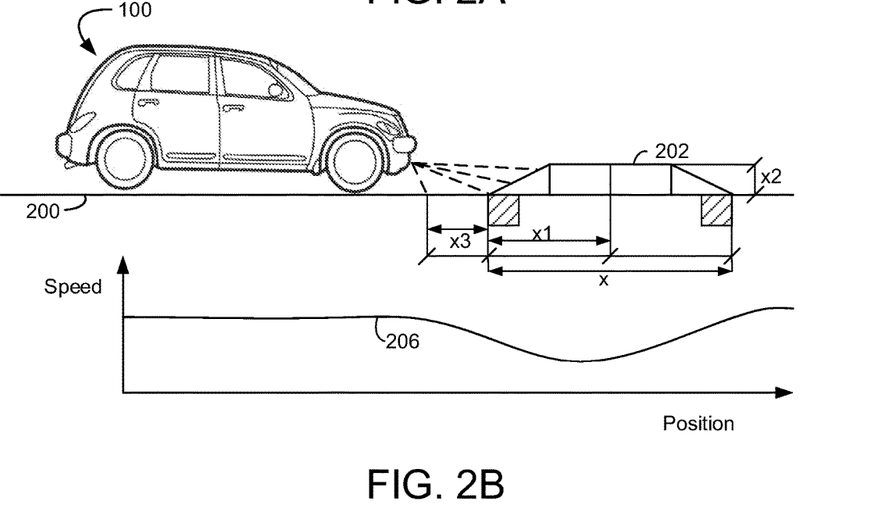
FIG. 2B is an illustration of a vehicle detecting an abrupt road change prior to impact and dynamic adjustment of the suspension, braking, and/or speed parameters of the vehicle, according to one or more embodiments of the disclosed subject matter.

In another exemplary embodiment, illustrated in FIG. 2B, data and/or information about the oncoming abrupt road change 202 is dynamically detected (e.g., on the order of seconds or milliseconds) as the vehicle 100 approaches the abrupt road change 202. For example, data or information about a profile of the abrupt road change 202 can be collected from output signals of various sensors in sensor section 130 via interface 145 of the ECU 140. The collected output signals can be stored in the ROM 142 to be executed by CPU 141, tables (look-up tables and stored maps), constants, and the like. ECU 140 may also be configured to use CPU sensing capabilities and, for example, the computation processing capabilities of other vehicles and/or smart devices connected to a global control system, to collect the data and information about the profile of the abrupt road change 202 and a location of the abrupt road change 202, e.g., via Global Positioning System (GPS).

For example, as the front wheels 102 FR, 102 FL of the vehicle 100 approach an abrupt road change 202 (e.g., a speed bump, a pothole, or any other vertical deviation), the vehicle uses output signals collected from sensor section 130 to determine a profile of the abrupt road change 202 in advance of encountering the abrupt road change 202. Since the abrupt road change 202 results in a deviation from the immediately preceding road surface 200 and thus a positive change in the surface height $x_2$ at least a positive slope portion where the front wheels 102 FR, 102 FL first encounter the abrupt road change 202 can be determined in advance. As the wheels 102 FR, 102 FL, 102 RR, 102 RL of the vehicle 100 travel over the abrupt road change 202, data and information about a negative slope portion where the wheels 102 FR, 102 FL, 102 RR, 102 RL leave the abrupt road change 202, and a top portion between the slope portions can be determined.

For example, as the vehicle 100 travels on the road surface 200 in the x direction at an operating speed $v_x$, proximity sensors (e.g., ultrasonic, radar, vision, Lidar, vehicle to vehicle, etc.) of sensor section 130 are used to determine a position of the vehicle 100 relative to the abrupt road change 202. The proximity sensors or some fusion of the proximity sensors of the vehicle 100 can detect data or information about the profile of the road surface in front of the vehicle 100. The detected data and/or information is used to calculate and detect a distance to the abrupt road change 202. Distances, lengths, and/or elevations of the abrupt road change 202 may be determined by the ECU 140, for example, by processing the data received via interface 145 from the proximity sensors.

The operating speed $v_x$ can be determined using, for example, wheel position sensors 132 FR, 132 FL, 132 RR, and 132 RL, which respectively output signals having frequencies corresponding to the respective rotational speeds of the wheels 102 FR, 102 FL, 102 RR, and 102 RL and a vehicle speed sensor 134 mounted in, for example, a transaxle, which outputs a voltage signal to a powertrain control module (PCM) in relation to a current vehicle operating speed. Once the profile of the abrupt road change 202, a position of the vehicle 100 relative to the abrupt road change 202, and an operating speed $v_x$ of the vehicle 100 is determined, the ECU 140 uses output signals received from a lift/drive input sensor 135 which obtains suspension lift information via the PCM from a throttle position, vehicle speed, and transaxle gear input signal to calculate a suspension dive information from a rate of vehicle speed change when decelerating.

Once the distance of the vehicle from, length, and/or elevation of the detected abrupt road change 202 is determined, the ECU 140 can transmit a signal to limit, for example, a power output of the drive force transmission 110 and request a speed reduction of the vehicle. In response, the drive force transmission 110 can reduce the throttle in an effort to automatically reduce the speed of the vehicle 100 as it approaches the detected abrupt road change 202. Alternatively, or in addition to, the ECU 140 can transmit a signal to the brake control module 120 to automatically apply brake torque to the vehicle 100 by varying the hydraulic brake pressure within the wheel cylinders WFR, WFL, WRR, and WRL through control of pressure valves.

In another exemplary embodiment, when, for example, the front wheels 132 FR, 132 FL of the vehicle 100 encounters the abrupt road change 202 at the decelerated operating speed $v_x$, the wheel position sensors 132 FR, 132 FL, 132 RR, and 132 RL output signals corresponding to wheel-to-body movement, and suspension height information. An accelerometer (not shown) mounted on each corner of the vehicle 100 outputs signals corresponding to vertical acceleration of the body of the vehicle. This information and/or data is collected via interface 145 at ECU 140 and stored to be executed by the CPU 141, tables (look-up tables and stored maps), constants, and the like, the next time the vehicle 100 encounters the abrupt road change 202.

In another exemplary embodiment, when, for example, the rear wheels 132 RR, 132 RL of the vehicle 100 leave a negative slope portion of the abrupt road change 202, the ECU 140 gradually increases the operating speed $v_x$ of the vehicle 100. Alternatively, the ECU 140 may alert a driver to "resume" a previous operating speed $v_x$.

Because the abrupt road change 202 is detected before the vehicle 100 encounters it, the operating speed $v_x$ is comfortably reduced in advance of hitting the abrupt road change 202 and the impact to the vehicle 100 is mitigated. The impact to the vehicle 100 is illustrated at line 206 in FIG. 2B as a relationship between the operating speed $v_x$ of the vehicle 100 and the position of the vehicle 100 in relation to the abrupt road change 202 when impact occurs.

Figure 3:
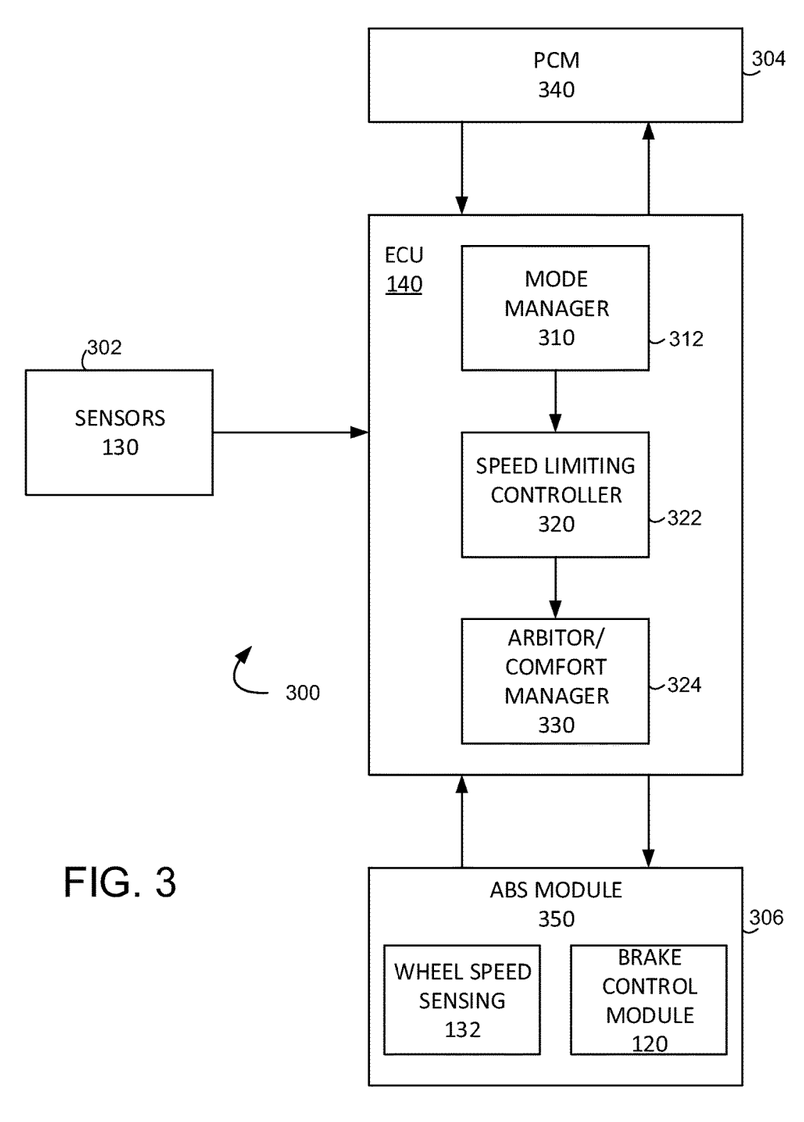
FIG. 3 is a simplified routine executed by a central processing unit (CPU) of the vehicle illustrated in FIG. 1, according to one or more embodiments of the disclosed subject matter.

As illustrated in FIG. 3, information and/or data about the abrupt road change 202 (e.g., a speed bump, pothole, or any other vertical deviation) and/or irregularity in the road surface (e.g., slippery surfaces like slick, wet roads, ice or gravel) collected and stored at ECU 140 are retrieved from the ROM 142 and executed by CPU 141 at Step 302. At Step 304, the PCM 340 sends an output signal about a suspension dive information and rate of vehicle speed change when decelerating to mode manager 310 and speed limiting controller 320. At step 306, the ABS module/brake control module 350 collects output signals corresponding to the respective rotational speeds of the wheels 102 FR, 102 FL, 102 RR, and 102 RL via wheel position sensors 132 FR, 132 RL, 132 RR, and 132 RL. The ABS module/brake control module 350 sends the output signals to the speed limiting controller 320. The mode manager 310 at Step 320 determines a distance to the abrupt road change 202. If the distance of the vehicle 100 to the abrupt road change 202 is below a threshold, a activate speed limiting controller 320 flag is enabled, e.g., ENABLED_SLC. The speed limiting controller 320 is enabled at Step 322. When, for example, the vehicle 100 leaves a negative slope portion of the abrupt road change 202, the ECU 140 via the mode manager 310 gradually increases the operating speed $v_x$ of the vehicle 100 and the speed limiting controller 320 is automatically disabled at Step 322, e.g., DISABLED_SLC. Alternatively, the ECU 140 may alert a driver to "resume" a previous operating speed $v_x$ via mode manager 310 such that the speed limiting controller 320 is manually disabled at Step 322.

At Step 322, after receiving information and/or data about the abrupt road change 202 (e.g., a speed bump, pothole, or any other vertical deviation) and/or irregularity in the road surface (e.g., slippery surfaces like slick, wet roads, ice or gravel) at Step 302 and the PCM 340 status at Step 304, the speed limiting controller 320 outputs a brake torque control command to brake control module 120 and a speed limiting command to PCM 340. The brake torque command limits a brake torque ramp so that each computation load, additional brake torque is requested until the current vehicle operating speed $v_x$ of the vehicle 100 is comfortably reduced to a desired operating speed $v_x$. The brake torque command can limit an amount of brake torque asked for each loop to manage noise and vibration of the hydraulic pump. At Step 324, the arbiter/comfort manager 330 determines an optimal amount of torque based on the position of the vehicle 100 in relation to the abrupt road change and a current operating speed $v_x$ to achieve a comfortable deceleration.

Figure 4:
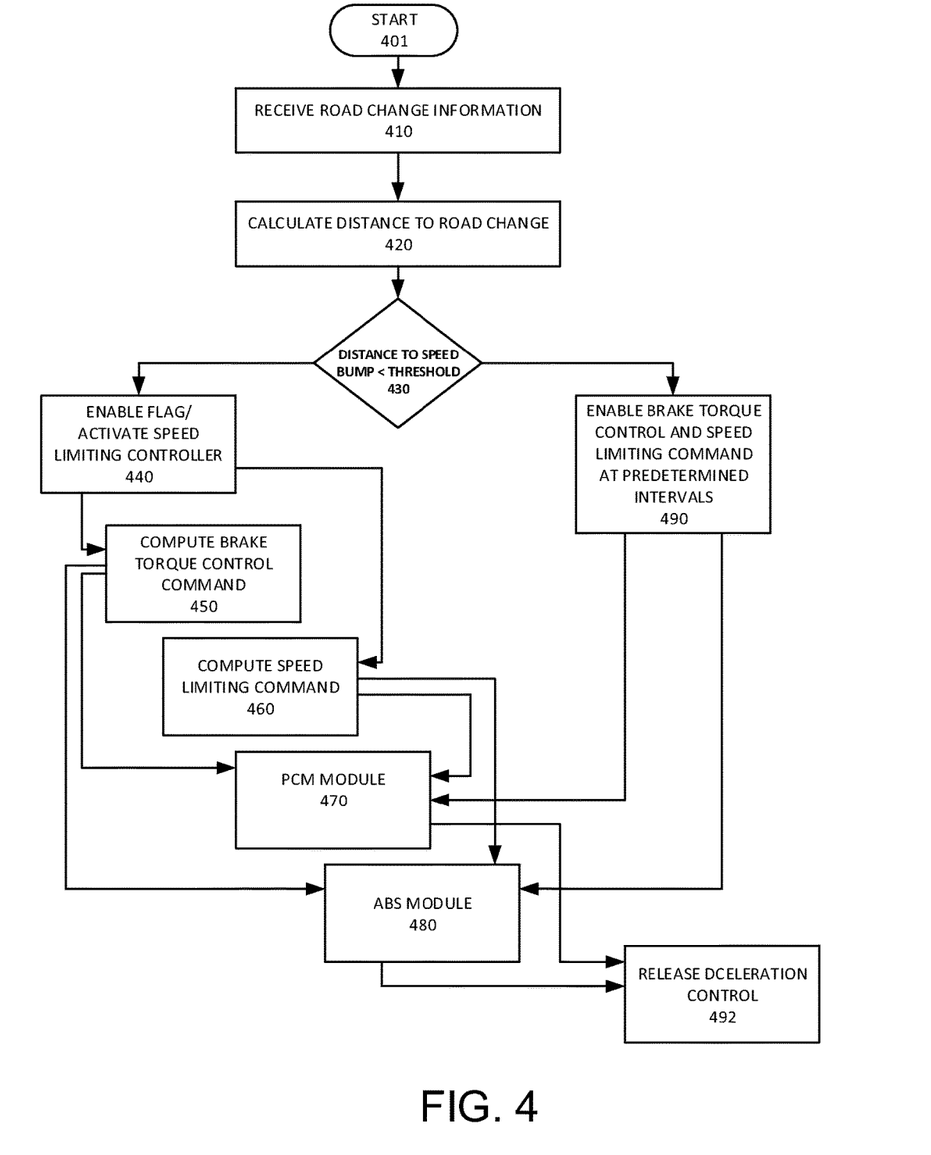
FIG. 4 is a simplified flow diagram of an exemplary scheme, according to one or more embodiments of the disclosed subject matter.

As illustrated in FIG. 4, at Step 401, a wheel 102 FR, 102 FL, 102 RR, 102 RL of a vehicle 100 approaches an abrupt road change 202 (e.g., a speed bump, a pothole, or any other vertical deviation) and/or irregular road surface. In one exemplary embodiment, the abrupt road change 202 includes a positive slope portion where the front wheels 102 FR, 102 FL first encounter the abrupt road change 202, a negative slope portion where the wheels 102 FR, 102 FL, 102 RR, 102 RL leave the abrupt road change 202, and a top portion between the slope portion. As the vehicle 100 travels on the road surface 200 in the x direction, illustrated in FIG. 2B, at an operating speed $v_x$, data and/or information about the oncoming abrupt road change 202 is dynamically detected (e.g., on the order of seconds or milliseconds) from output signals of proximity sensors (e.g., ultrasonic, radar, vision, Lidar, vehicle to vehicle, etc.) at Step 410.

At Step 420, as the vehicle 100 travels on the road surface 200 in the x direction at an operating speed $v_x$, the ECU 140 uses the collected output signals to calculate a distance to the abrupt road change 202. Distances, lengths, and/or elevations of the abrupt road change 202 may also be determined by the ECU 140, for example, by processing the data received via interface 145. In one exemplary embodiment, the collected output signals can be collected from a plurality of vehicles 100 traveling along a given road surface 200 in an x direction and can be stored in a global ROM 142 to be executed by a global CPU 141, tables (look-up tables and stored maps), constants, and the like. In this way, a local ECU 140 of a particular vehicle 100 may be configured to use global CPU sensing capabilities and, for example, the computation processing capabilities of other vehicles and/or smart devices connected to the global control system, which collects data and information about the profiles of abrupt road changes 202 and a corresponding location via, for example, GPS.

At Step 430, the ECU 140 via mode manager 310 determines a distance to the abrupt road change 202. If the distance of the vehicle 100 to the abrupt road change 202 is below a threshold, a activate speed limiting controller 320 flag is enabled, e.g., ENABLED_SLC, at Step 440. At Step 450, after receiving an ENABLED_SLC flag, the ECU 140 via speed limiting controller 320 and a compute speed limiting command at Step 460, the speed limiting controller 320 via mode manager 310 outputs a speed limiting command to PCM Module 340 at Step 470 and a brake torque control command to brake control module 120 at Step 480. The PCM outputs a voltage signal in relation to a current vehicle operating speed; based on the current vehicle operating speed $v_x$, the PCM calculates suspension dive information from a rate of vehicle speed change when decelerating. The brake control module 120 generates brake hydraulic pressure that corresponds to an operating force; the brake torque command limits the brake hydraulic pressure supplied to corresponding wheel cylinders WFR, WFL, WRR, WRL through either a pressure-reducing and/or pressure inducing valve. This hydraulic pressure within the wheel cylinders WFR, WFL, WRR, and WRL can be increased, maintained, and/or reduced through control of either valve. Return brake fluid can likewise be returned from the pressure-reducing valves to a reservoir via hydraulic pumps. In addition, the brake torque command limits a brake torque ramp so that each computation load, e.g., additional brake torque, is requested until a current operating speed $v_x$ of the vehicle 100 is comfortably reduced to a desired operating speed $v_x$. The brake torque command can limit an amount of brake torque asked for each loop to manage noise and vibration of the hydraulic pump. The ECU 140 uses the arbiter/comfort manager 330 to determine an optimal amount of torque based on the position of the vehicle 100 in relation to the abrupt road change 202 and a current operating speed $v_x$ to achieve a comfortable deceleration.

At Step 490, the ECU 140 via mode manager 310 determines a distance to the abrupt road change 202. If the distance of the vehicle 100 to the abrupt road change 202 is above a threshold, the activate speed limiting controller 320 flag is not enabled, e.g., DISABLED_SLC, and the speed limiting controller 320 via mode manager 310 outputs a predetermined speed limiting command to PCM Module 340 at Step 470 instructing the PCM to decelerate at a predefined rate at Step 470 based on a current operating speed $v_x$ of the vehicle 100. At Step 490, brake torque control command that corresponds to the predefined rate is sent to ABS module/brake control module 350. The brake control module 120 generates brake hydraulic pressure that corresponds to a desired operating force at Step 480; the brake torque command limits the brake hydraulic pressure supplied to corresponding wheel cylinders WFR, WFL, WRR, WRL through either a pressure-reducing and/or pressure inducing valve. This hydraulic pressure within the wheel cylinders WFR, WFL, WRR, and WRL can be increased, maintained, and/or reduced through control of either valve. Return brake fluid can likewise be returned from the pressure-reducing valves to a reservoir via hydraulic pumps. At Steps 470 and 480

At Step 492, when, for example, the rear wheels 132 RR, 132 RL of the vehicle 100 leave the negative slope portion of the abrupt road change 202, the ECU 140 gradually increases the operating speed $v_x$ of the vehicle 100 and releases the deceleration control. Alternatively, at Step 492, the ECU 140 may alert a driver to "resume" a previous operating speed $v_x$. Thus, because the abrupt road change 202 is detected before the vehicle 100 encounters it, the operating speed $v_x$ is comfortably reduced in advance of hitting the abrupt road change 202 and the impact to the vehicle 100 is mitigated.

The method described above can be performed in one or more devices of the vehicle. For example, the method can be performed by a control device of the suspension system such as a central control unit (not shown) or controller. The control device can be implemented within any element of the suspension system such as a control unit. Alternatively, the control device can be a separate device from any of the above-described suspension system elements.

The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A vehicle assist system, comprising:
   a sensor configured to detect a profile and a distance of an irregular road surface ahead of a vehicle in a direction of travel; and
   a control unit configured to:
      store detected information from the sensor about the profile and the distance of the irregular road surface, and
      adjust an operating speed of the vehicle based on:
         the detected distance, and
         the stored profile information of the irregular road surface.

2. The system of claim 1, wherein the irregular road surface is one of a slick, wet road, ice and gravel.

3. The system of claim 1, wherein the sensor is further configured to:
   detect information about the profile using one of ultrasonic sensing, radar sensing, vision sensing, Lidar sensing, and vehicle to vehicle sensing.

4. The system of claim 3, wherein the detected distance of the irregular road surface is a distance relative to the vehicle.

5. The system of claim 1, wherein the control unit is further configured to:
   determine that the distance is below a threshold, wherein the threshold is a time-based threshold for activation; and
   adjust a brake torque of at least one wheel cylinder based on a current operating speed of the vehicle and the distance of the vehicle relative to the irregular road surface.

6. The system of claim 1, wherein the control unit is further configured to:
   adjust a suspension height of one or more wheels of the vehicle and an expected vertical acceleration of a body of the vehicle based on the stored profile information of the irregular road surface.

7. The system of claim 1, wherein prior to a portion of the vehicle reaching the irregular road surface, a suspension height of one or more wheels of the vehicle and an expected vertical acceleration of the vehicle are adjusted.

8. A vehicle system, comprising:
   a sensor configured to detect a profile and distance of an irregular road surface ahead of a vehicle in a direction of travel; and
   a controller configured to:
      receive and store data from the sensor indicative of the detected profile of the irregular road surface and the distance of the vehicle relative to the irregular road surface; and
      based on the stored profile of the irregular road surface and the stored distance, adjust at least one of a suspension height, an expected acceleration, and an operating speed of the vehicle.

9. The vehicle system of claim 8, wherein the sensor is further configured to:
   collect the data about the profile and distance of the irregular road surface using one of ultrasonic sensing, radar sensing, vision sensing, Lidar sensing, and vehicle to vehicle sensing.

10. The vehicle system of claim 9, wherein the controller is further configured to:
    output a speed limiting command when the calculated distance of the vehicle relative to the irregular road surface is below a threshold.

11. The vehicle system of claim 10, wherein the threshold is a time-based threshold for actuation.

12. The vehicle system of claim 10, wherein the speed limiting command reduces a current operating speed of the vehicle at a preset rate, wherein the preset rate is independent of the calculated distance of the vehicle relative to the irregular road surface.

13. The vehicle system of claim 8, wherein the controller is further configured to:
    output a voltage signal in relation to a current vehicle operating speed;
    output a speed limiting command to reduce a current operating speed of the vehicle at a preset rate; and
    based on the preset rate, calculate suspension dive information of the vehicle when the vehicle is decelerated.

14. A vehicle, comprising:
    at least one wheel;
    at least one sensor; and
    a controller configured to:

receive signals from the at least one sensor indicative of a sensed profile of an irregular road surface and a distance of the vehicle relative to the irregular road surface;

based on the received signals, determine that the distance is below a time-based threshold for activation; and adjust a suspension height of at least one wheel based on at least one of the sensed profile of the irregular road surface, the distance of the vehicle relative to the irregular road surface, and a current operating speed of the vehicle.

15. A method for controlling a vehicle, comprising:

detecting, via a sensor, and storing information about, a profile of an irregular road surface and a distance of irregular road surface in front of the vehicle;

based on the detected distance and a current operating speed, reducing an operating speed of the vehicle; and based on the profile, adjusting suspension parameters associated with the vehicle.

16. A vehicle assist system, comprising:

a sensor configured to determine a distance of a vehicle relative to an irregular road surface in a direction of travel; and a control unit configured to:
  detect and store information about a profile of the irregular road surface,
  adjust an operating speed of the vehicle based on:
    the determined distance, and
    the stored profile information of the irregular road surface, and
  adjust a suspension height of one or more wheels of the vehicle and an expected vertical acceleration of a body of the vehicle based on the stored profile information of the irregular road surface.

* * * * *